United States Patent
Aihara et al.

[19]

[11] Patent Number: 6,010,370
[45] Date of Patent: Jan. 4, 2000

[54] INSERT MOLDED ELECTRICAL CONNECTOR AND METHOD FOR PRODUCING SAME

[75] Inventors: Shinichi Aihara, Ebina; Masahiro Shiga, Yamato, both of Japan

[73] Assignee: Molex Incorporated, Lisle, Ill.

[21] Appl. No.: 08/992,064

[22] Filed: Dec. 17, 1997

[30] Foreign Application Priority Data

Dec. 20, 1996 [JP] Japan .................................. 8-355110

[51] Int. Cl.⁷ ................................................ H01R 17/00
[52] U.S. Cl. .......................... 439/660; 439/74; 439/722; 439/736; 29/883
[58] Field of Search ............................. 439/660, 74, 736, 439/722, 604, 606; 29/883, 884, 722

[56] References Cited

U.S. PATENT DOCUMENTS

| | | | |
|---|---|---|---|
| 4,501,465 | 2/1985 | Hoshino et al. | 339/176 |
| 4,863,402 | 9/1989 | Black et al. | 439/736 |
| 4,865,562 | 9/1989 | Burg et al. | 439/395 |
| 5,057,028 | 10/1991 | Leinke et al. | 439/686 |
| 5,074,039 | 12/1991 | Hillbish et al. | 29/883 |
| 5,116,247 | 5/1992 | Enomoto et al. | 439/660 |
| 5,161,985 | 11/1992 | Ramsey | 439/74 |
| 5,167,528 | 12/1992 | Nishiyama et al. | 439/489 |
| 5,176,541 | 1/1993 | Mori | 439/736 |
| 5,181,855 | 1/1993 | Mosquera et al. | 439/74 |
| 5,192,232 | 3/1993 | Lenz et al. | 439/660 |
| 5,199,884 | 4/1993 | Kaufman et al. | 439/74 |
| 5,201,883 | 4/1993 | Atoh et al. | 29/883 |
| 5,224,866 | 7/1993 | Nakamura et al. | 439/81 |
| 5,395,250 | 3/1995 | Engler, Jr. et al. | 439/65 |
| 5,445,529 | 8/1995 | Yamamoto | 439/81 |
| 5,476,389 | 12/1995 | Ono | 439/83 |
| 5,478,248 | 12/1995 | Mitra et al. | 439/74 |
| 5,498,167 | 3/1996 | Seto et al. | 439/74 |
| 5,499,924 | 3/1996 | Arisaka et al. | 439/67 |
| 5,501,009 | 3/1996 | McClure | 29/882 |
| 5,535,513 | 7/1996 | Frantz | 29/882 |
| 5,626,500 | 5/1997 | Yoshimura | 439/862 |
| 5,667,393 | 9/1997 | Grabbe et al. | 439/83 |
| 5,772,474 | 6/1998 | Yagi et al. | 439/660 |
| 5,779,505 | 7/1998 | Yagi et al. | 439/660 |
| 5,836,773 | 11/1998 | McHugh et al. | 439/74 |
| 5,842,875 | 12/1998 | Yagi | 439/74 |

FOREIGN PATENT DOCUMENTS

| | | |
|---|---|---|
| 4413064 C2 | 4/1994 | Germany . |
| 2-273487 | 11/1990 | Japan . |
| 6-215837 | 8/1994 | Japan . |
| 6-310197 | 11/1994 | Japan . |
| 6-325825 | 11/1994 | Japan . |
| 7-16381 | 3/1995 | Japan . |
| WO 96/24969 | 8/1996 | WIPO . |
| WO 97/04505 | 2/1997 | WIPO . |

OTHER PUBLICATIONS

IBM Technical Disclosure Bulletin vol. 6 No. 4 Sep. 1963, pp. 29 & 30, "Expandable Terminal Insert Strip".

*Primary Examiner*—Paula Bradley
*Assistant Examiner*—Tho D. Ta
*Attorney, Agent, or Firm*—James C. Paschall

[57] ABSTRACT

An electrical connector component has a body portion and a plurality of conductive terminals disposed within the connector body portion. The terminals are arranged at regular intervals and partially embedded in at least one sidewall of the connector body portion during the process of insert-molding the connector component. Each terminal includes a contact portion and a solder tail portion which extends out of the body portion. The contact and engagement portions are retained in place on the connector body portion by virtue of being partially embedded in the body portion, thus preventing movement or deformation of the contact portion in the connector body portion because of forces applied thereto during molding.

21 Claims, 6 Drawing Sheets

INSERT MOLDED ELECTRICAL CONNECTOR AND METHOD FOR PRODUCING SAME

BACKGROUND OF THE INVENTION

The present invention relates generally to an insert molding process for producing an electrical connector as well as the electrical connectors produced thereby. More specifically, the invention relates to an insert molding process, in which an electrical connector is formed by injection molding of an insulative housing material and by accurately setting and retaining a group of terminals in place within the mold prior to and during the forming of the connector housing.

Electrical connectors have long been used for establishing connections between electrical or electronic circuits and one or more conductors disposed on a printed circuit board or other electrical element. Typically, an electrical connector has a housing formed from an electrically insulative material and a plurality of conductive terminals arranged within the connector housing in a predetermined pattern and in a predetermined pitch or terminal-to-terminal spacing. In some applications, it is desirable that the terminals are integrated with the connector housing.

In such an instance, the installation of the terminals as a group within the connector housing is typically performed either by press-fitting the terminals into portions of the connector housing, or by setting the terminals into a mold and insert molding the connector housing around the terminals.

As can be appreciated, it is essential for the electrical connector that the configurations of respective terminals in the group of terminals are uniform prior to and during molding, and that the respective terminals are accurately aligned with a correct pitch and correct attitude. In insert molding, the group of terminals are formed by stamping and/or forming the terminals from thin metal stock. The group of terminals are then set within the mold at a predetermined correct pitch and attitude. However, the molding material enters the mold under high injection pressure during molding and this injection pressure generates forces that may be applied directly to the terminals. These forces may often cause a fluctuation of the pitch between the terminals in the terminal group and sometimes may also cause a deformation, such as bending, in individual terminals, resulting in degradation of the expected precision of the connectors.

The present invention is therefore directed to a connector construction with beneficial terminal retention characteristics and a connector molding process that overcomes the aforementioned problems.

SUMMARY OF THE INVENTION

Accordingly, it is an object of the present invention to provide an insert molding process for producing an electrical connector, in which the terminals of the connector are easily installed in a correct pitch and attitude with respect to each other and to the connector housing.

Another object of the present invention is to provide an electrical connector in which the terminals are insert molded in the connector housing and in which the connector terminals are aligned together in proper position and pitch in the housing, no matter the pitch of the terminals.

Still another object of the present invention is to provide a connector having an insulative housing and a plurality of conductive terminals arranged thereon, wherein the terminals are partially embedded in the housing material.

Still yet another object of the present invention is to provide an electrical connector component being adapted to mate with an opposing connector component, the connector component having at least one vertical sidewall with a plurality of conductive terminals arranged thereon and extending over the top of the sidewall, portions of the terminals in these two areas being exposed with the remainder of the terminals being embedded in the connector housing.

A further object of the present invention is to provide a method of making small pitch connectors by forming terminal-receiving passages in a mold core member, arranging a set of conductive terminals in the terminal-receiving passages so that parts of the bodies of the terminals are received therein, retaining the terminals in place in a manner so that the parts of the terminals are sandwiched between respective opposing portions of the mold pieces; and, then injecting a molding material into a mold cavity formed in part by the mold core member to form a finished connector.

It is yet a further object of the present invention to provide an electrical connector component having an electrically insulative connector body and a plurality of electrically conductive terminals disposed therein in a predetermined pitch, the connector component being adapted to engage an opposing connector component to establish an electrical connection therebetween, the connector component connector body having at least one sidewall extending therefrom, the sidewall having a terminal support surface upon which said the terminals are disposed in their predetermined pitch, the sidewall further having a series of grooves partially extending therealong, and extending into top surfaces of the sidewall that adjoin the sidewall mounting surfaces, the grooves having a depth that is less than the thickness of the terminals such that portions of the terminals are held within the grooves and the remainder of the terminals project out of the grooves.

In order to accomplish the aforementioned and other objects of the invention, one aspect of the present invention is the provision of a method for making a connector that includes the steps of: providing a mold having first and second cooperating molded core members that releaseably engage each other; placing a group of individual terminals onto the first core into a corresponding plurality of terminal-receiving receptacle portions formed therein that are formed with a predetermined pitch, the receptacle portions restricting movement of the terminals; moving the second core member into contact therewith; and, injecting a molding material into the mold after fixing the first and second mold core members together to thereby restrict movement of the individual terminal by the receiving portion.

Preferably, the first mold core member includes a sliding block carrying a projection that mates with a portion of a corresponding individual terminal when assembled to the second core member for restricting movement of the individual terminal away from the receptacle portions of the first core, such that individual terminals are prevented from deforming due to injection pressure.

Also, the receptacle portions may define a plurality of grooves arranged at a predetermined pitch corresponding to a desired pitch of the terminals of the terminal group and each respectively formed for accommodating a single terminal therein, and the step of setting the terminals may be performed by placing individual terminals in corresponding grooves. Alternatively, the receptacle portions may be formed by way of a plurality of projections arranged on the first mold core member whereby the projections define a clearance therebetween at a predetermined spacing corresponding to a desired pitch of the individual terminals and respectively formed for accommodating each individual terminal, such that the placement of the terminals is performed by placing individual terminals in corresponding clearances.

The grooves preferably have a depth that is less than the overall average thickness of the terminals such that part of the terminals lie embedded in the insulative housing material and the remaining part of the terminals are exposed and project above the surfaces of the connector housing.

According to the foregoing method, upon forming the insulative connector housing, each individual terminal of the connector is supported in a corresponding receptacle portion that restricts the movement of the terminal. Thus, the electrical connector can be manufactured with the terminals being aligned in accurate pitch. Furthermore, since the second mold core member is provided with projections for mating with the portions of the terminals, deformation of each terminals due to injection pressure of the resin can be successfully prevented.

In another aspect of the present invention, a small pitch connector is provided and includes at least a central receptacle area for receiving a plug portion of an opposing connector, the receptacle area being defined by multiple walls of the connector housing. The terminals are partially embedded in the vertical and horizontal portions of the housing sidewalls.

These and other objects, features and advantages of the present invention will be clearly understood through a consideration of the following detailed description.

BRIEF DESCRIPTION OF THE DRAWINGS

In the course of the following description of the detailed description, reference will be made to the attached drawings wherein like reference numerals identify like parts and wherein.

DETAILED DESCRIPTION OF THE PREFERRED EMBODIMENTS

The present invention shall be discussed hereinafter in terms of a preferred embodiment illustrated in the accompanying drawings. In the following description, numerous specific details are set forth in order for the reader hereof to gain a thorough understanding of the present invention. It will be obvious, however, to those skilled in the art that certain well-known elements may not be shown in detail in order to unnecessarily obscure the present invention.

Figure 1:
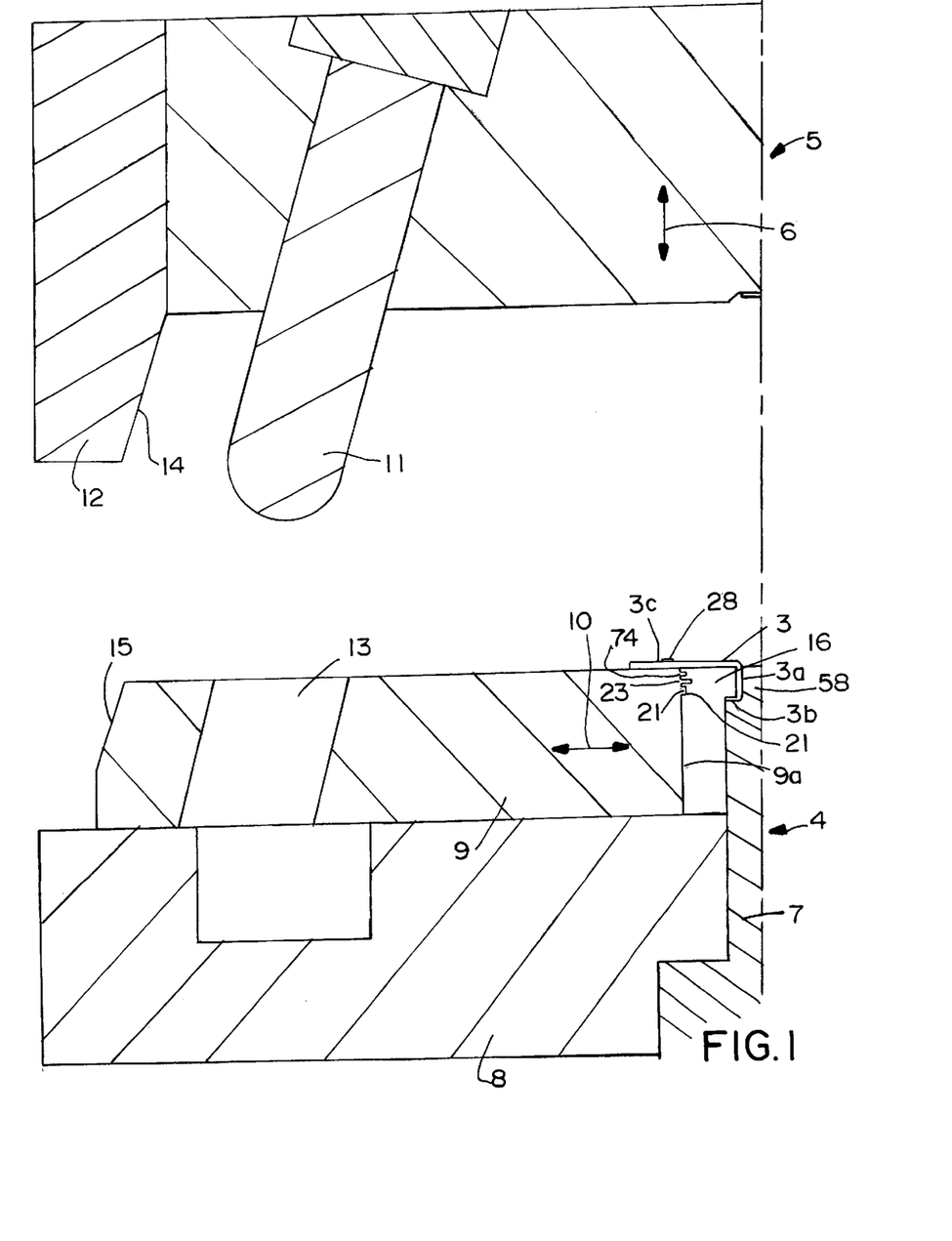
FIG. 1 is a cross-sectional view of one half of a mold assembly illustrating a step in the molding process with the first and second mold core members in an open position depicting how a group of terminals is set in the mold.
Figure 2:
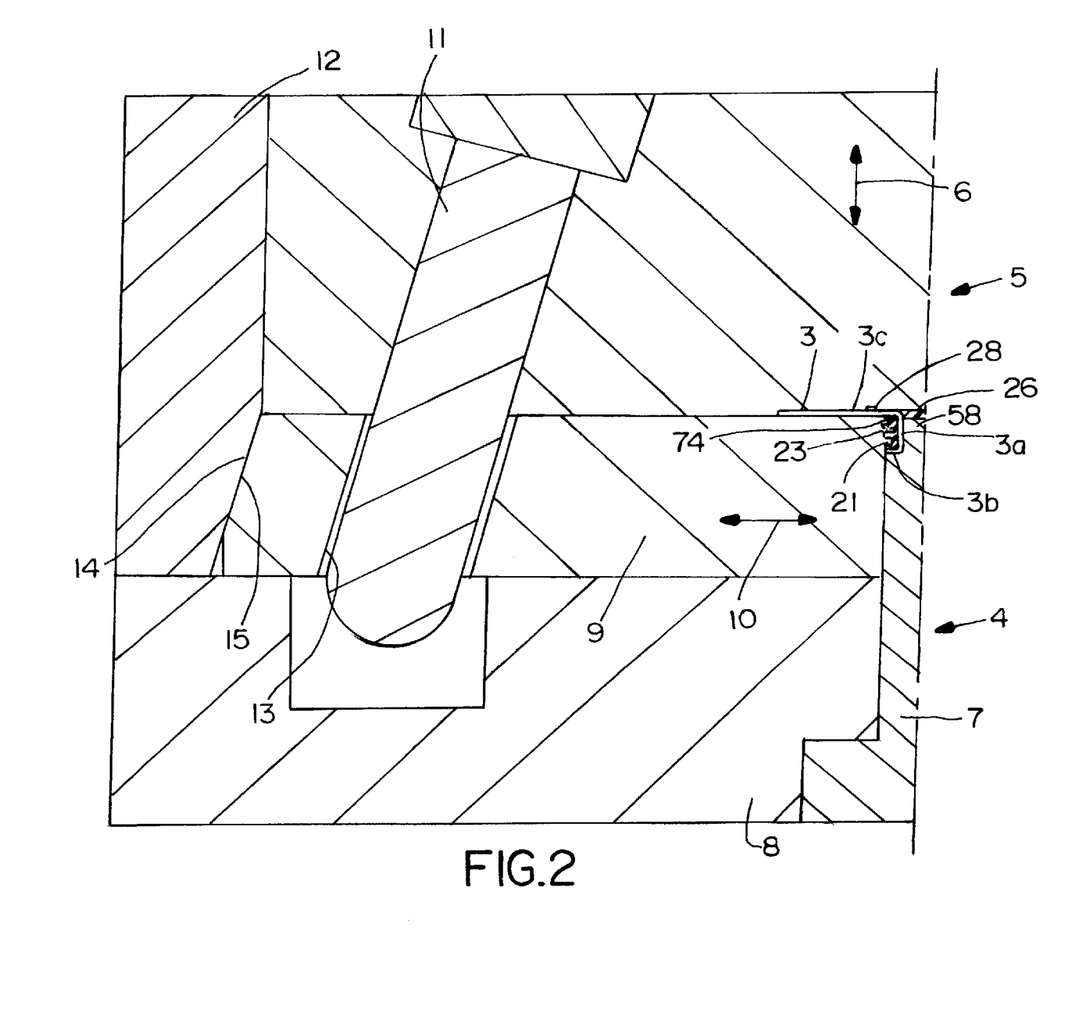
FIG. 2 is a cross-sectional view of the mold assembly of FIG. 1 illustrating another step in the molding process utilized to make connectors constructed in accordance with the principles of the present invention.
Figure 3:
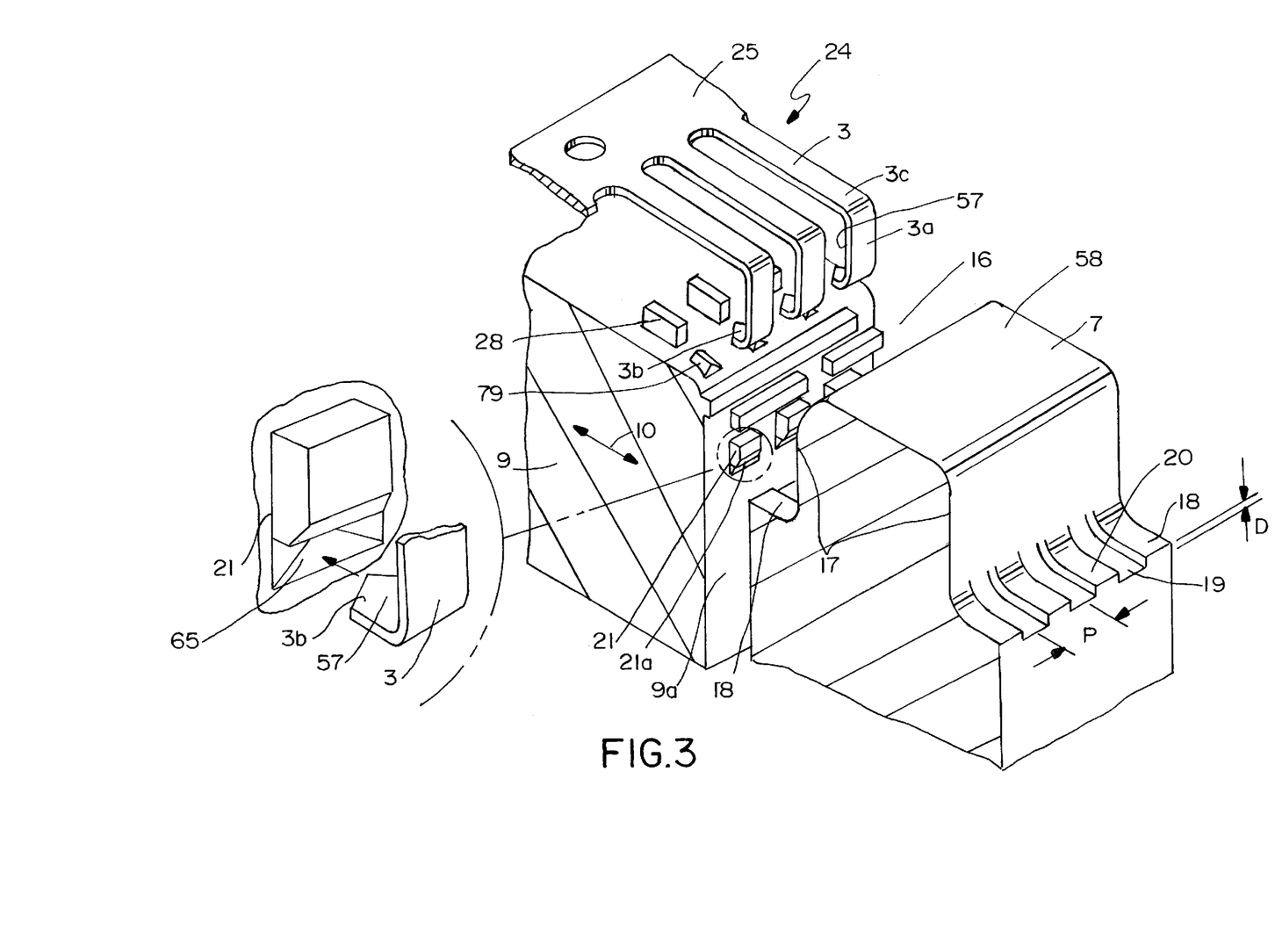
FIG. 3 is an enlarged perspective cross-sectional, detail view illustrating portions of the first and second mold core members of the mold assembly of FIG. 1 with an enlarged portion showning a terminal about to engage a recess in the mold.
Figure 4:
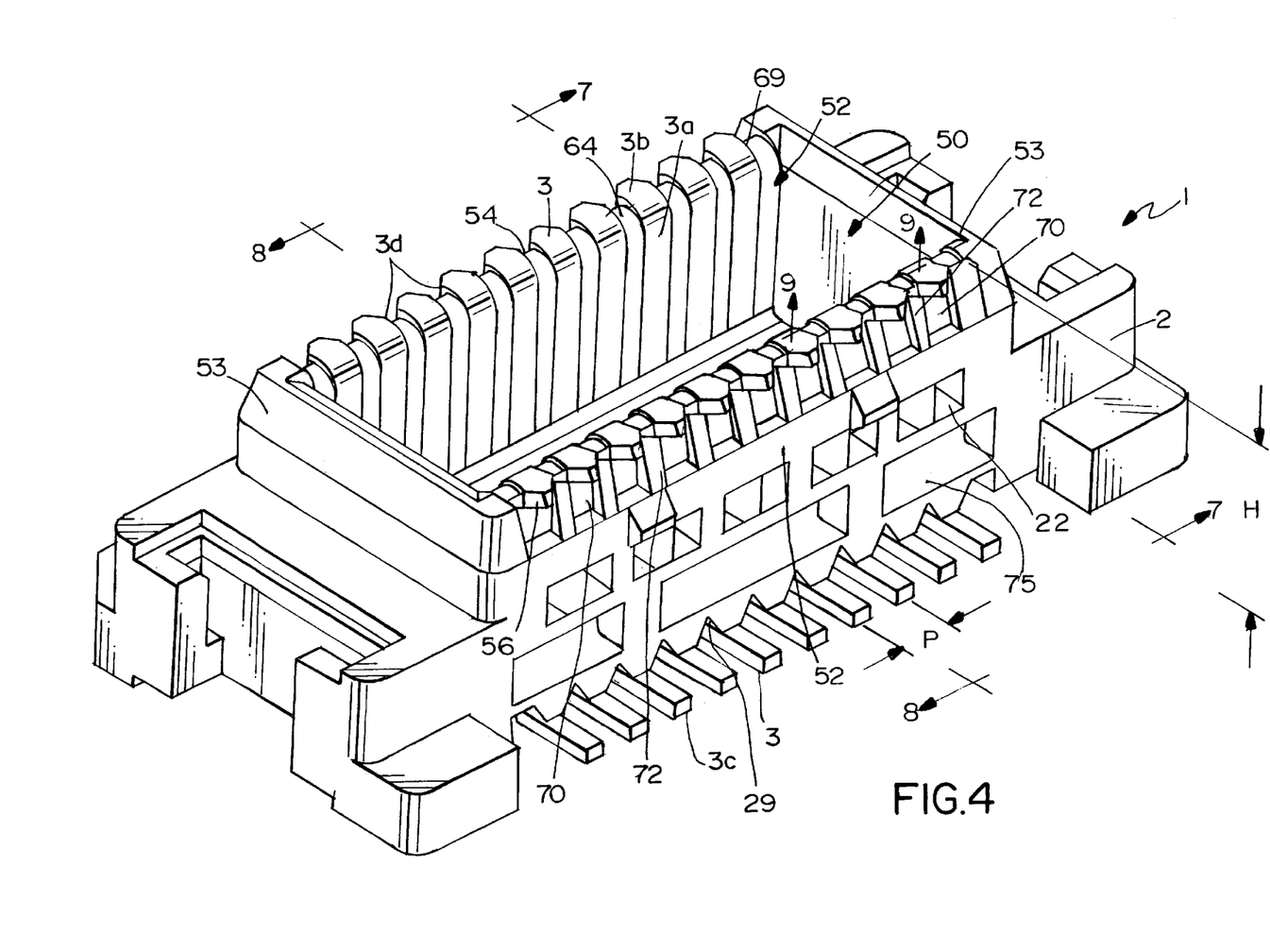
FIG. 4 is a perspective view of an electrical connector constructed in accordance with the principles of the present invention.

FIGS. 1–3 illustrate the major portions of a mold used for producing an electrical connector component 1 as illustrated in FIG. 4. The connector 1 can be seen as including a connector housing 2 formed from an electrically insulative material and a plurality of electrically conductive terminals 3 arranged within the housing 2 in alignment with each other and with a given pitch P.

The connector housing 2 includes a central opening 50 that defines a receptacle for an opposing connector of the plug type (not shown) that mates with the connector 1 in a manner well known in the art. In this mating, the two connectors engage each other in a manner such that the terminals 3 of the connectors electrically contact each other. The connector opening 50 extends between opposing sidewalls 52 of the connector housing 2. The sidewalls 52 are connected at their opposing ends by endwalls 53. As seen best in FIG. 4, the endwalls 53 extend slightly above the topmost level H of the sidewalls 52, which have a reduced height relative to the end walls. The terminals 3 are arranged in sets on opposing interior surfaces 54 of the connector housing sidewalls 52 in the predetermined pitch P.

The terminals 3 have contact portions 3a that extend vertically within the connector opening 50 and along the interior surfaces 54 of the sidewalls 52 thereof. The contact portions 3a terminate in connector housing engagement portions 3b at one end thereof and terminate in generally horizontal solder tail portions 3c at the other end thereof. As seen in FIGS. 2, 3 and 4, the housing engagement portions 3b and the solder tail portions 3c of the terminals 3 preferably extend at an angle to the contact portions 3a. The housing engagement portions 3b and solder tail portions 3c typically extend in horizontal planes. The terminals 3 have an overall average thickness t that is shown at their side edges 3d in FIG. 9.

A mold employed in molding the connectors 1 is sectionally shown in FIGS. 1 and 2. It should be noted that FIGS. 1 and 2 show half of the mold and the other half of the mold is substantially a mirror image of that depected in FIGS. 1 and 2. The mold includes a first, or rear core piece 4 and a second, or front core piece 5 that releaseably engage each other. The front core piece 5 is moveable toward and away from the rear core piece 4 as shown by the arrow 6 in FIGS. 1 and 2. The rear core piece 4 is provided with a central rear core piece main body 7, a set of spacer elements 8 (only one is shown) disposed at both sides of the rear core piece main body 7 and a set of slidable blocks 9 provide on the spacer elements 8 for movement in the direction shown by arrow 10.

Figure 5:
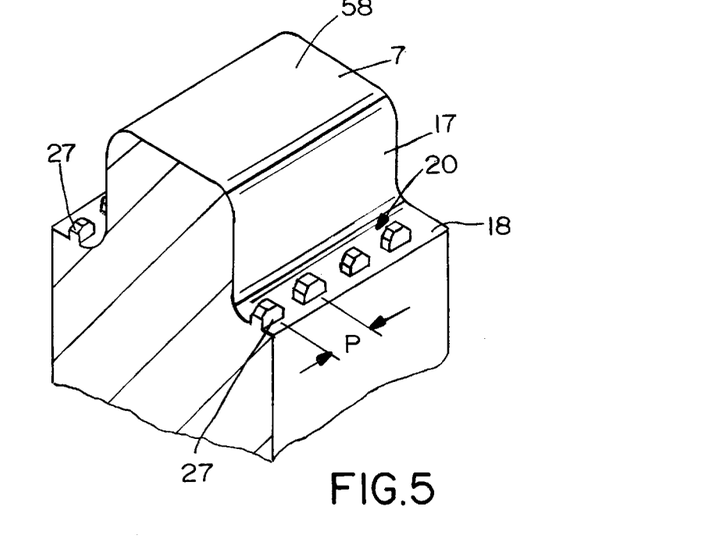
FIG. 5 is an enlarged perspective cross-section detail view illustrating another form of a first mold core member suitable for use in the mold assembly of FIG. 1.

A set of mold core pins 11 may be provided in an angular disposition extending obliquely from a surface of the front core piece 5 toward the rear core piece 4 and in opposition to the sliding blocks 9 thereof. Each of the sliding blocks 9 is formed with one or more guide holes 13 that also extend obliquely in order to accommodate the end tips of the core pins 11. A locking block 12 is provided along one edge of the mold assembly to locate the front and rear core pieces 5, 4 in engagement together.

The locking block 12 and the sliding block 9 are provided with respective tapered surfaces 14, 15 that mate with each other when the mold assembly is closed. Therefore, when the front core piece 5 is moved from an open position as illustrated in FIG. 1 to its engagement position as illustrated in FIG. 2, where it mates with the rear core piece 4, the angled core pins 11 enter the guide holes 13 of the guide blocks 8 and thereby move the sliding block 9 toward the rear core piece main body 7. Simultaneously, the tapered surface 14 of the locking block 12 will contact the tapered surface 15 of the sliding block 9 in order to lock the sliding block at its position moved toward the rear core piece main body 7.

Conversely, when the front core piece 5 is released away from the rear core piece 4, the locking of the sliding block 9 is released as the tapered surfaces 14, 15 move apart. The withdrawal of the angled pins 11 from the guide holes 13 assists in the movement of the sliding blocks 9 away from the rear core piece main body 7.

Figure 6:
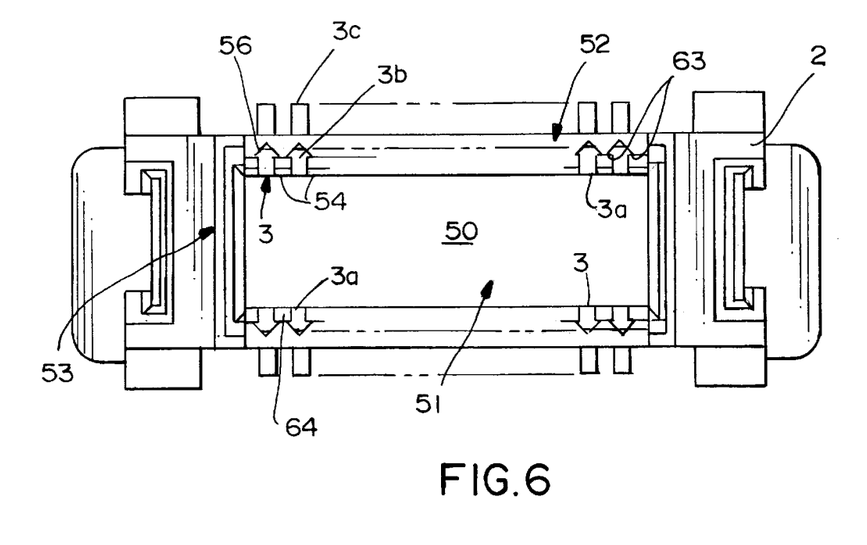
FIG. 6 is a top plan view of the connector of FIG. 4.
Figure 7:
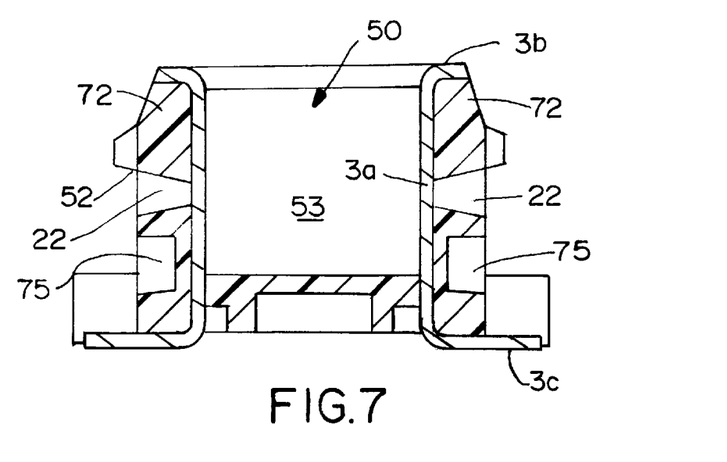
FIG. 7 is a cross-sectional view of the connector of FIG. 4 taken along lines 7—7 thereof through the connector housing in the space occupied by a pair of opposing, aligned terminals.

A clearance 16 is initially defined between the rear core piece main body 7 and the sliding mold block 9. This clearance or cavity is illustrated best in FIG. 1 at 16, and it permits the conductive terminals 3 to be set in the mold at their respective positions for molding into the connector housing 2. A terminal strip 25 that is used in the molding process and that contains a plurality of individual terminals 3 is illustrated in FIG. 3. The terminals 3 include triangular-shaped housing retention portions 56 as shown in FIGS. 3 and 6. These retention portions 56 have edges 63 shown in FIG. 6 that engage the connector housing 2 along the upper surfaces 64 of the housing sidewalls 52.

From FIG. 3 and as mentioned above, it can be seen that each terminal 3 includes a contact portion 3a that eventually is maintained in place as a contact in the connector 1 along the inner surfaces 54 of the connector housing sidewalls 52 (FIG. 4), a mold and connector housing engagement portion 3b with a connector housing retention portion 56 at its end and a solder tail portion 3c. The mold engaging portion 3b and solder tail portion 3c preferably extend at angles to the contact portions 3a of the terminals. Although the mold engaging portion 3b and the solder tail portion 3c are shown extending at right angles from the contact portion 3a, no angle or other angles may be utilized in the context of the claimed invention.

The rear core main body piece 7 has a configuration generally complementary to the terminal 3. That is, it includes a head portion 58 that forms the central opening 50 of the connector 1, a pair of terminal contact portion support walls 17 that extend between the head portion 58 and a pair of terminal engagement portions 18. The terminal contact portion support walls 17 support at least a portion of the terminal contact portions 3a during molding and preferable support the entire length of such contact portions 3a. Similarly, the terminal engagement portions 18 of the main body rear core piece 7 support the engagement portions 3b of the terminals 3.

A series of grooves, or recesses 19, are formed in both the vertical and horizontal surfaces 17, 18 of the rear main body core piece 7 that have a width preferably equal to the width of the individual terminals 3. The grooves 19 are arranged at a predetermined pitch corresponding to the desired pitch P of the terminals 3 in the finished connector 1. (FIG. 4). A series of raised, or land portions 66, separate the grooves 19 from each other and, when molding material is introduced into the mold, will serve to define the upper surface, or top ledge 64, of the connector housing sidewalls 52. Preferably, the grooves 19 have a depth that is less than the overall average thickness t of the terminals 3. Thus, the two surfaces 17, 18 preferably cooperate to form a terminal engaging and contact portion receptacle portion 20 on the main body rear core piece 7.

Figure 8:
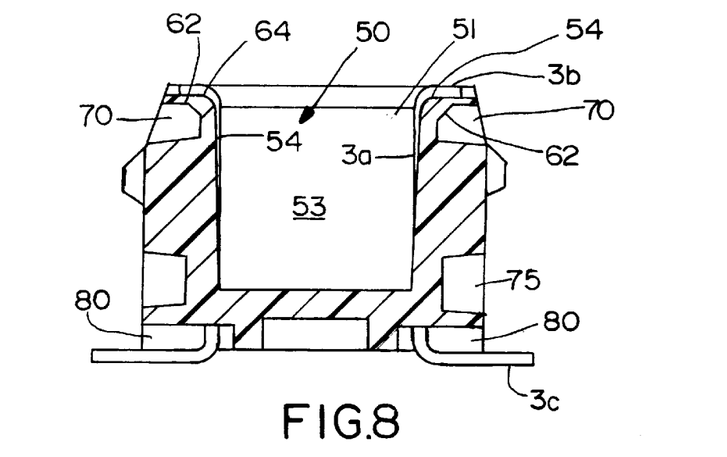
FIG. 8 is a cross-sectional view of the connector of FIG. 4 taken along lines 8—8 thereof through the connector housing in the space separating adjacent terminals; and, FIG. 9 is an enlarged detail view of the connector housing-terminal interface of the connector of FIG. 4, taken along lines 9—9 thereof.

On a surface of the mold core sliding block 9 that opposes the rear core main body piece 7, a series of projections 21 are preferably provided at a pitch and arrangement that matches that of the grooves 19 so that the projections are located in opposition to the grooves 19. When the sliding block 9 is moved toward the rear core main body 7 so that the projections 21 will engage the interior surfaces 57 of the terminal mold block engagement portions 3b of the terminals 3 set in the grooves 19. These projections 21 form in the finished connector recesses 70 separated by dividers 72 as shown in FIGS. 4 and 8. At the protruding tips thereof, each projection 21 may include a chamfered edge 21a so as to gently abut the terminal portion 3b and not interfere with them as received within their respective grooves 19. As illustrated best in FIG. 8, these chamfered edges 21a result in the formation in the finished connector sidewalls 52 of a ledge, or layer 62, of housing material aligned with and beneath the terminal housing engagement portion 3b.

Additionally, in one embodiment of the invention shown in FIGS. 1 and 2, the opposing surface 9a of the sliding mold block 9 may also include additional projections 23 for engaging and supporting the terminals 3 in the placement on the rear body main core piece 7. These projections form openings 22 in the housing sidewalls 52. Additional projections 74 are on the surface 9a for forming openings 75 in the housing sidewalls 52. Further projections 79 on the sidewalls 52 for holding the terminals 3 in alignment form recesses 80 in the housing sidewalls 52.

In the process of molding, the mold is placed into an initial position such as shown in FIG. 1 where the mold is opened and the front core piece 5 is moved away from the rear core piece 4. This opening movement, by virtue of the angled pins 11, causes a displacement of the sliding block 9 away from the rear core main body 7 to expose the clearance 16 between the two which facilitates the setting of the terminals 3 therein. The terminals 3 are typically set in place while they are connected to a carrier strip 25 (FIG. 3) along their solder tail portions 3c. Dividers 28 disposed between terminals 3 additionally assist to assure accurate terminal alignment. The terminals 3 are therefore set in the mold as an integrated terminal group 24.

In instances where the terminals 3 have the triangular-shaped retention portions 56 (FIGS. 4–8), the sliding mold block 9 may contain recesses 65 that are complementary in shape to the retention portions 56 and are aligned with the grooves 19 of the first mold block. Thus, when the terminals 3 are set into place on the first mold block 4 and the sliding block 9 is brought thereagainst, the retention portions 56 are received in and held by the opposing recesses 65. When the terminal group 24 is set in place, the respective mold engagement portions 3b (and at least part of the contact portions 3a) thereof are received within the grooves 19 of the terminal receptacle portion 20 of the main body rear core 7.

Once the terminals 3 are set in place, the front core piece 5 is shifted toward the rear core piece 4 to place the two core pieces 4, 5 together in close proximity as illustrated in FIG. 2. At this time, the projections 21 respectively each engage against the inner surfaces 57 of the terminal mold engaging portions 3b and assist in holding them in place within the mold. An insulative molding material 26, such as plastic or resin, is injected into the mold cavity defined by the mold core pieces 4 and 5 to form the connector housing 2. This molding material will flow through the mold cavity and around the terminals 3, particularly the rear sides of the terminals 3 and around the side edges 3d of the terminals 3, in essence creating grooves 69 in the connector housing sidewalls 52 in which the terminals 3 are partially embedded. After curing, the mold core pieces are moved apart and the finished connector 1 is ejected from the mold. Further processing of the connector 1 will entail cutting the terminal solder tail portions 3c near the carrier strip 25.

Figure 9:
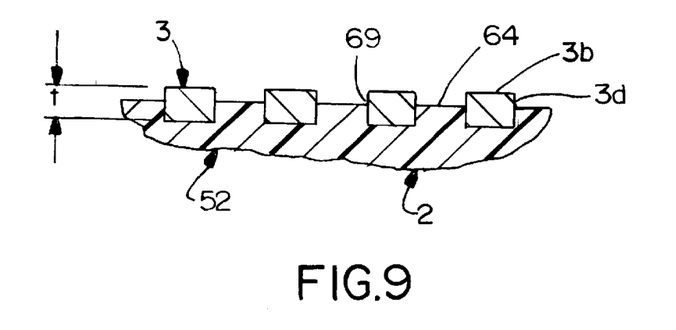

In this process, the terminals 3 are maintained in their predetermined pitch P as they are received within the receptacle portion 20 of the terminal engaging surfaces 17, 18 of the rear core main body 7. The grooves 19 in the rear core main body 7 and the projections 21 cooperate to restrict any movement of the terminals under the force of the molding material injection pressure. Not only are the connector terminals 3 maintained in their pitch P and alignment throughout their entire extent in the connector housing 2, but as illustrated in FIG. 9, the top surfaces of all of the terminals 3 (especially the housing engagement portions 56 and when desired, portions of the contact portions 3a) lie in a common plane. The connector 1 may therefore be produced with a high degree of precision with respect to its terminal arrangement.

The projections 21 assist in effect in clamping the terminals 3, most notably the engagement portions 3b thereof to the engaging piece support wall 18 of the rear core main body piece 7 to successfully prevent the terminals 3 from deforming due to the injection pressure of the molding material 26 or for any other reason. The projections 21 are particularly useful in holding the terminals 3 in place given that the grooves 19 have a depth D less than the thickness t of the terminals 3, especially in their terminal contact portions 3a and housing engagement portions 3b, so that the projections 21 will hold the terminals 3 in place under the impact of injection molding pressure, particularly due to the impact of molding material upon the sides 3d of the terminals 3. This process is particularly useful in instances where the terminals 3 are very thin and/or are formed from a very resilient material.

In instances where the terminals 3 are thick or where they are formed in a rigid configuration or from a relatively highly rigid or stiff material, the need for the projections 21 on the opposing surface 9a of the mold slide block 9 becomes less necessary. In these instances, the need for grooves 19 on the terminal receptacle portion 20 of the rear core main body support wall 18 also becomes less necessary. Rather, as shown in FIG. 5, the terminals 3 may be retained in place on the rear core main body 7 by way of a series of upstanding projections 27 that are arranged thereon in intervals having the same pitch P as the terminals 3. The mold engaging portions 3b of the terminals 3 are then received by and held between the projections 27.

While the preferred embodiment of the invention have been shown and described, it will be apparent to those skilled in the art that changes and modifications may be made therein without departing from the spirit of the invention, the scope of which is defined by the appended claims.

It is claimed:

1. An electrical connector, comprising: a connector housing formed from an electrically insulative material, the housing having a pair of spaced-apart sidewalls and a pair of endwalls to define an opposing connector element-receiving space bounded by said connector housing sidewalls and endwalls, said connector housing sidewalls having interior surfaces that confront the opposing connector element-receiving space and upper surfaces that lie generally adjacent said opposing connector element-receiving space; and, a plurality of electrically conductive terminals mounted in said connector housing, the terminals being arranged lengthwise in spaced-apart order at a predetermined pitch along said housing sidewall interior and upper surfaces, each of said terminals having a solder tail portion, a connector housing engagement portion and a body portion extending between the solder tail and connector housing engagement portions, said solder tail portions extending out of said connector housing and positioned for connection to a circuit board, said connector housing engagement portions engaging said housing along said sidewall upper surfaces and said body portions extending along said sidewall interior surfaces in said predetermined pitch, said sidewall upper surfaces including a series of grooves formed therein that accommodate a first thickness of said connector housing engagement portion of said terminals therein, individual terminals being accommodated in individual grooves such that said first thickness of said terminals lie embedded in said grooves and a second thickness above said first thickness of said terminals extend out of said grooves.

2. The connector as defined in claim 1, wherein said endwalls have a height that is greater than a corresponding height of said sidewalls and said endwalls have respective upper surfaces that are spaced apart from said sidewall upper surfaces.

3. The connector as defined in claim 1, wherein said terminal housing engagement and solder tail portions are angularly offset from said terminal body portions.

4. The connector as defined in claim 1, wherein said sidewall interior and upper surfaces intersect each other.

5. The connector as defined in claim 1, wherein said grooves have a depth less than an average thickness of said terminals, such that part of said terminals is received within said grooves and part of said terminals project out of said grooves, said terminal parts that project out of said grooves lying in a common plane.

6. The connector as defined in claim 1, wherein said sidewalls include a plurality of cavities formed therein and disposed beneath said terminal housing engagement portions.

7. The connector as defined in claim 6, wherein each said terminal housing engagement portion has a tip portion that extends from said terminal body portion for a predetermined length, the tip portion having lateral edges that engage said sidewall upper surfaces.

8. The connector as defined in claim 7, wherein said connector housing includes a plurality of support ledge portions that are aligned with and disposed beneath said terminal housing engagement portions to thereby partially support said terminal housing engagement portions in place on said connector housing.

9. An electrical connector component which is engageable with an opposing connector component to provide an electrical connection between the connector component and the opposing connector component, said connector component comprising: a connector body formed from an electrically insulative material, a plurality of electrically conductive terminals insert molded in the connector body, said connector body having at least one sidewall having a terminal mounting surface and a top ledge associated therewith, said conductive terminals being disposed along said sidewall terminal mounting surface in a predetermined pitch, said top ledge of said connector body sidewall having a series of terminal-receiving grooves formed therein by insert molding the terminals in the sidewalls, the terminal-receiving grooves having a depth less than a corresponding thickness of said terminals such that part of said terminals partially project out of said grooves.

10. The connector component as defined in claim 9, wherein a mounting surface on a top ledge of said sidewall intersects said sidewall terminal mounting surface.

11. The connector component as defined in claim 10, wherein said connector component includes at least one endwall, the endwall having a top ledge associated therewith, said endwall having a height greater than a corresponding height of said sidewall, such that said endwall top ledge is spaced apart from and higher than said sidewall top ledge.

12. The connector component as defined in claim 10, wherein each of said terminals includes a contact portion disposed along said sidewall terminal mounting surface, a solder tail portion extending out of said connector component body, and a connector component body engagement portion that extends along and engages a portion of said sidewall top ledge.

13. The connector component as defined in claim 12, wherein part of said terminal contact portions and said sections of terminal housing engagement portions are received within said grooves, and wherein sections of said terminal housing engagement portions that project out of said grooves lie in a common plane.

14. The connector component as defined in claim 13, wherein said terminal housing engagement portions include lateral retaining edges that engage said sidewall top ledges.

15. A method for molding an electrical connector component of the type having a connector component housing formed from an electrically insulative material and further having a plurality of electrically conductive terminals disposed therein, the terminals having a predetermined thickness, the method comprising the steps of:

providing at least first and second interengaging mold blocks to mate together to form at least a portion of a mold cavity, providing terminal receptacle portions on said first mold block which include a plurality of terminal-receiving slots formed thereon, said terminal-receiving slots being sized to partially receive therein, corresponding first portions of said terminals and maintain said terminals in a predetermined pitch, said terminal-receiving slots for partially restricting movement of said terminals within said mold cavity, placing electrically conductive terminals between said first and second mold blocks so that portions of said terminals are partially held within said terminal-receiving slots of said first mold block, moving said second mold block close to said first mold block such that said first and second mold blocks contact said terminals and hold them in place in alignment with said terminal-receiving slots, and, injecting an insulative molding material into said mold cavity to form a connector housing having a pair of sidewalls with upper surfaces in contact with said terminals, said terminals partially projecting out of said terminal-receiving slots such that said terminals are partially embedded within said molding material of said connector housing and partially protrude therefrom from said upper surface of respective sidewalls.

16. The method as set forth in claim 15, wherein said terminals include tip end portions and further including the step of providing a series of recesses on said second mold block in alignment with said terminals such that said terminal tip ends are received within said recesses when said first and second mold blocks are brought together.

17. The method as set forth in claim 15, wherein said terminal-receiving slots include a plurality of grooves formed in a first surface of said first mold block.

18. The method as set forth in claim 17, wherein said first mold block includes a second surface that extends at an angle to said first surface thereof, and said grooves extend from said first surface into said second surface, such that said grooves partially retain said terminals in two different directions while said molding material is being injected into said mold cavity.

19. The method as set forth in claim 18, further including the steps of forming a plurality of terminal-engaging projections on a first surface of said second mold block equal in number to said plurality of grooves formed in said first mold block; and aligning said first and second mold blocks together such that each of said terminal-engaging projections oppose a single groove;

and, bringing said first and second mold blocks together so that said terminal-engaging projections engage said terminals received in said grooves.

20. The method as set forth in claim 15, further including the steps of providing a series of projections on said second mold block corresponding in number to said terminal receiving slots, said second mold block projections being aligned with said terminal-receiving slots and in confronting relationship therewith, and contacting said terminals with said second mold block projections to hold them in place within said terminal-receiving slots.

21. The method as set forth in claim 20, further including the step of providing a series of recesses on said second mold block, said second mold block recesses being aligned with said first mold block terminal-receiving slots and with said second mold block projections, said recesses receiving tip ends of said terminals therein when said first and second mold blocks are brought together.

* * * * *